Feb. 5, 1963  E. P. LARSH  3,076,352
GEAR MEMBERS AND METHOD OF PRODUCING SAME
Filed Oct. 13, 1958  2 Sheets-Sheet 1

INVENTOR
EVERETT P. LARSH
BY William R. Jacox
HIS ATTORNEY

Feb. 5, 1963 E. P. LARSH 3,076,352
GEAR MEMBERS AND METHOD OF PRODUCING SAME
Filed Oct. 13, 1958 2 Sheets-Sheet 2
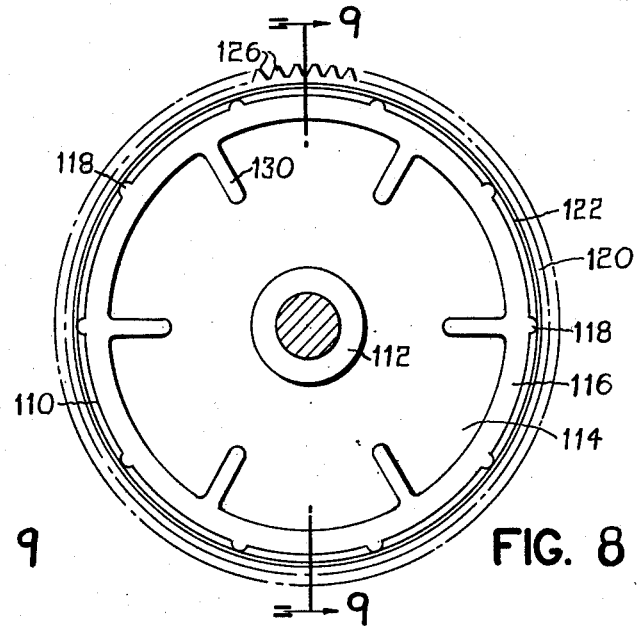
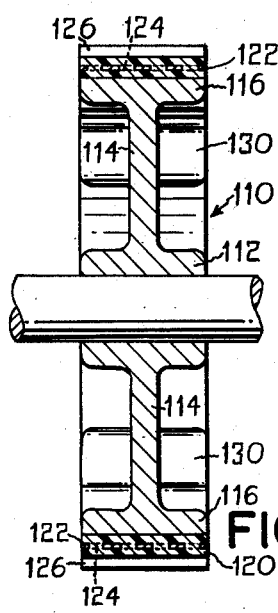
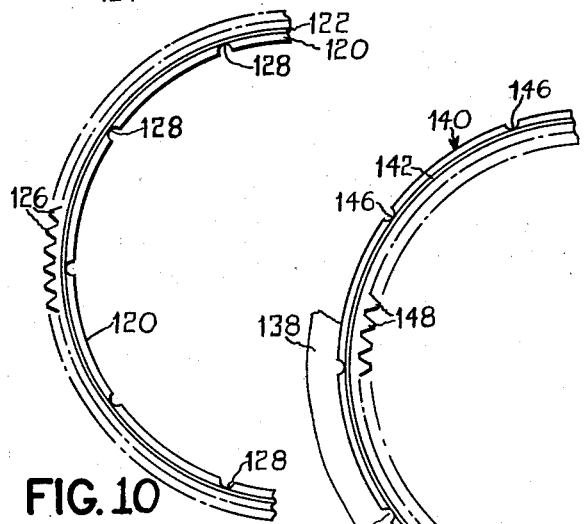
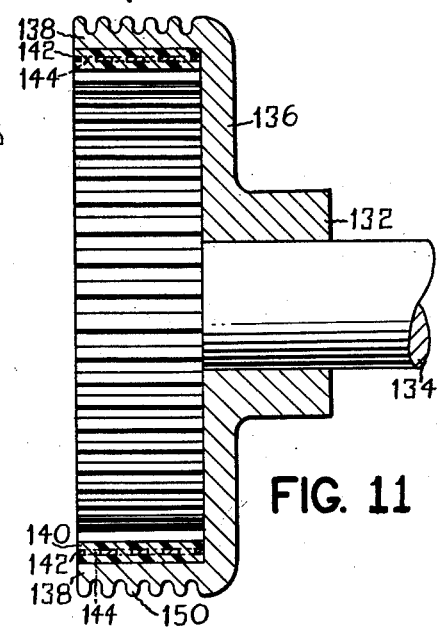
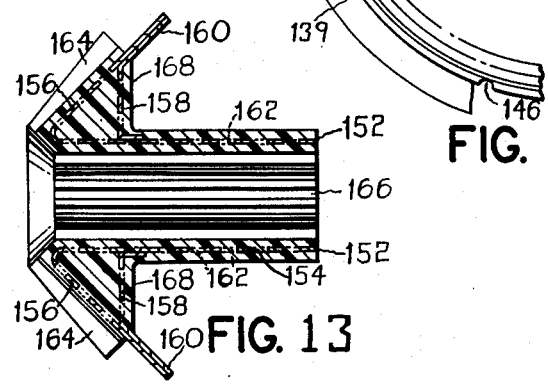
INVENTOR
EVERETT P. LARSH
BY *William R Jacox*
HIS ATTORNEY

United States Patent Office 3,076,352
Patented Feb. 5, 1963

3,076,352
GEAR MEMBERS AND METHOD OF
PRODUCING SAME
Everett P. Larsh, 124 E. Monument Ave., Dayton 2, Ohio
Filed Oct. 13, 1958, Ser. No. 766,993
12 Claims. (Cl. 74—443)

This invention relates to gears and a method of production thereof.

An object of this invention is to provide gear members which are extremely quiet in operation.

Another object of this invention is to provide gear members which are durable and long lived with a minimum of lubrication.

Another object of this invention is to provide gear members which may be produced by a process such as molding or the like.

Another object of this invention is to provide gear members having extremely good strength characteristics in consideration of the weight thereof.

Another object of this invention is to provide gear members of material having an extremely low coefficient of friction.

Another object of this invention is to provide a method of producing such gear members.

Other objects and advantages reside in the construction of parts, the combination thereof, the method of manufacture, and the mode of operation, as will become more apparent from the following description.

In the drawings, FIGURE 1 is a perspective view of a support member of a gear of this invention.

FIGURE 8 is an elevational view of another type of construction of a spur gear made according to this invention.

FIGURE 9 is a sectional view taken substantially on line 9—9 of FIGURE 8.

FIGURE 10 is a fragmentary elevational view showing the outer rim of the spur gear of FIGURES 8 and 9.

FIGURES 11 is a sectional view showing an internal gear made according to this invention.

FIGURE 12 is a fragmentary end elevational view of the internal gear of FIGURE 11.

FIGURE 13 is a sectional view showing a bevel gear made according to this invention.

Generally speaking, a gear member of this invention comprises a body of material of the plastics type, such as nylon or Teflon or the like, which is molded in a desired form. Preferably a support member is used upon which the material is molded. It is preferred to have the support member provided with a plurality of apertures therethrough so that the molded plastic material extends through the apertures and is disposed on a plurality of surfaces of the support member. The plastic material is thus firmly locked or bonded to the support member.

Figure 1:
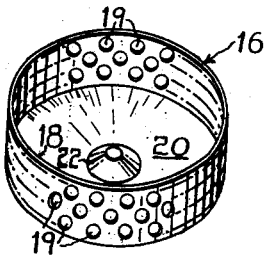

Referring to the drawings in detail, FIGURE 1 shows a support member 16 which comprises a ring 18 of any desired width and of comparatively thin material in consideration of its diameter. The ring 18 has a plurality of apertures 19 extending therethrough. A disc 20 is preferably integral with the ring 18. Plastic material such as nylon, Teflon, or the like is molded upon the ring 18 in the manner shown in FIGURES 2 and 3. The main portion of the plastic material is in engagement with or adjacent the ring 18. However, there is a small portion 23 of plastic material which extends slightly from the main body thereof and along the disc 20. This small portion 23 of plastic material may serve as a thrust surface, if desired.

A protuberance 22 is shown at the center of the disc 20. The protuberance 22 may be used, if desired, for alignment purposes during the molding process.

Figure 2:
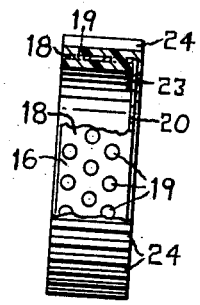
FIGURE 2 is a side view, with parts shown in section and with parts broken away, showing a spur gear of this invention in which the support member of FIGURE 1 is used.
Figure 3:
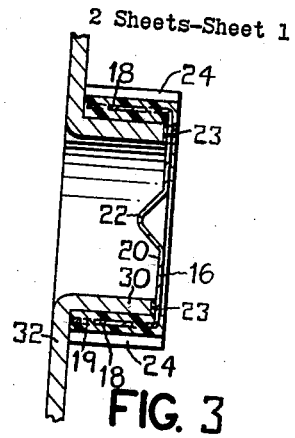
FIGURE 3 is a side sectional view showing the spur gear of FIGURE 2 disposed upon a mounting structure.

The plastic material extends through the apertures 19 of the ring 18 and is thus firmly locked or bonded thereto. When the plastic material is molded, teeth 24 are formed in the outer surface thereof, as best shown in FIGURE 2. Thus, a spur gear is formed. The spur gear may be rotatively mounted upon a cylinder 30 which may be integral with a wall 32, as shown in FIGURE 3. The inner surface of the plastic material slidably engages the cylinder 30 so that the spur gear is rotatable with respect to the cylinder 30. Due to the fact that the plastic material, such as nylon or Teflon or the like, has a very low coefficient of friction, the spur gear is readily rotatable with respect to the cylinder 30, even though little or no lubricating material is used.

Figure 4:
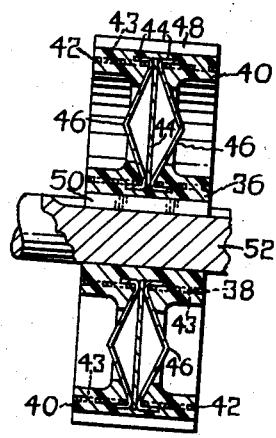
FIGURE 4 is a sectional view, with parts broken away, showing another type of construction of a spur gear member made according to this invention.

FIGURE 4 shows another type of construction of a spur gear made according to this invention. A hub 36 comprises a support ring 38. There is also an outer annular member 40 which has a support ring 42 therewithin. The support rings 38 and 42 are provided with a plurality of perforations or apertures 43 extending therethrough. Joining the support ring 38 to the support ring 42 is a web which includes a disc 44 and a pair of plates 46. Plastic material such as nylon, Teflon, or the like, is molded upon the support rings 38 and 42 so that the hub 36 is of plastic material and the outer annular member 40 is of plastic material. Teeth 48 are provided in the surface of the outer annular member 40 during the molding process. A bore extends through the hub 36. If desired, a slot may be provided in the bore of the hub 36 during molding thereof so that a key 50 may serve to nonrotatably attach the hub 36 to a shaft 52. The disc 44 and the plates 46 provide firm support and attachment between the hub 36 and the outer annular member 40. The disc 44 and the plates 46 also serve as radiators for dissipating any heat which may be generated in the teeth 48.

Figure 5:
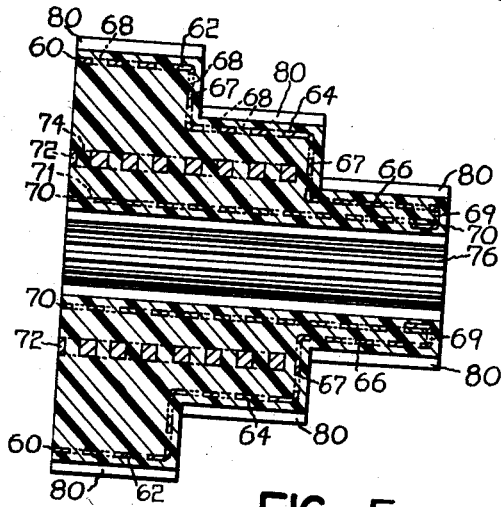
FIGURE 5 is a sectional view of a cluster gear made according to this invention.

A cluster gear made according to this invention is shown in FIGURE 5. This gear includes an outer support ring 60 which is shown as having three annular portions 62, 64, and 66. Each of the portions 62, 64, and 66 is of a different diameter, with the portion 62 having the greatest diameter and the portion 66 having the least diameter.

The portions 62, 64, and 66 are joined by connector portions 67 which are substantially normal thereto. The portions 62, 64, 66 and 67 are preferably integral one with the other and are provided with perforations or apertures 68.

The portion 66 of the outer support ring 60 is shown as having an extending turned down portion 69 which is attached by any suitable means, such as by welding or the like, to an inner support ring 70. The inner support ring 70 is provided with a plurality of apertures 71.

Disposed between the outer support ring 60 and the inner support ring 70 is an intermediate support ring 72 having apertures 74. The support ring 72 may be of greater thickness than the support rings 60 and 70. Plastic material is molded upon the support rings 60, 70, and 72, with the plastic material extending through the apertures in the support rings. The cluster gear of FIGURE 5 may be molded with a splined bore 76, as shown, if desired. Teeth 80 are formed in the outer surface of the plastic material adjacent the portions 66, 64, and 62 of the outer support ring 60.

Figure 6:
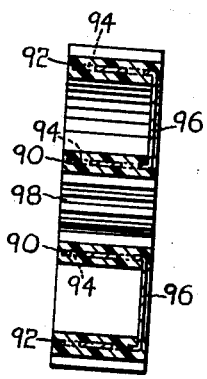
FIGURE 6 is a sectional view of still another construction of a spur gear member made according to this invention.

FIGURE 6 shows another construction of a spur gear made according to this invention. An inner support ring 90 and an outer support ring 92 are concentric one with the other and are provided with a plurality of apertures 94. The support rings 90 and 92 are joined by a disc or web 96 which is preferably integral therewith. Plastic material is molded upon the support rings 90 and 92 and extends through the apertures 94. The gear may be provided with a splined bore 98, as shown, or with a bore of any other desired shape.

Figure 7:
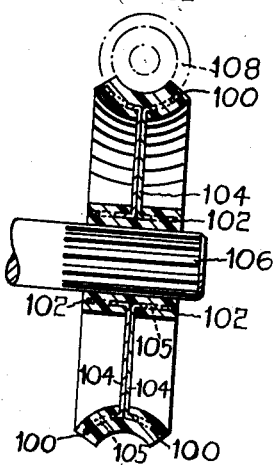
FIGURE 7 is a sectional view showing a worm gear made according to this invention.

FIGURE 7 shows a worm gear made according to this invention. An outer support ring 100 is arcuate in form and is shown as constructed in two portions, each of which is a peripheral portion of sheet material having an inner support ring 102 and a disc 104 integral with a half portion of the support ring 100, as shown in FIGURE 7. The discs 104 are in juxtaposed relation. The support rings 100 and 102 are provided with apertures 105. Plastic material is molded upon the support rings 100 and 102. A plurality of arcuate grooves or teeth are formed in the plastic material adjacent the outer support ring 100. The plastic material carried by the inner support rings 102 forms a hub which may be splined for attachment to a splined shaft 106 or the bore may be of any other desired shape. Thus, the worm gear as shown in FIGURE 7, is adapted to operate in meshed relation with a worm 108.

FIGURES 8, 9, and 10 show another spur gear made according to this invention. A wheel 110 has a hub 112 and a web 114 integral therewith. A rim 116 is integrally attached to the web 114. The rim 116 is provided with a plurality of ribs or protuberances 118 on the outer surface thereof, as shown in FIGURE 8. An outer rim 120, as partially shown in FIGURE 10, comprises a support ring 122 which is provided with a plurality of apertures 124 therethrough, as shown in FIGURE 9.

Plastic material is molded upon the support ring 122 and extends through the apertures 124. The plastic material is molded so that a plurality of teeth 126 are formed on the outer surface thereof. A plurality of grooves 128 are formed on the inner surface of the outer rim 120, there being one groove for each of the ribs 118. Each of the grooves 128 has a sufficient depth to expose a portion of the support ring 122. The outer rim 120 fits snugly upon the rim 116, with each of the ribs or protuberances 118 snugly disposed within one of the grooves 128, and with the ribs 118 being in firm engagement with the support ring 122.

Thus, the spur gear, as shown in FIGURES 8, 9, and 10, has an outer rim of plastic material. The support ring 122 within the body of plastic material, being in direct engagement with the ribs 118, transfers any heat generated in the plastic material through the ribs 118 and into the rim 116. Thence, the heat may be carried into the web 114. If desired, a plurality of fan blades 130 are attached to the rim 116 and to the web 114 to increase the heat transfer capacity of the wheel 110.

Also, the gear of FIGURES 8 and 9 may be produced by placing the support ring 122 upon the wheel 110 with the ring 122 in engagement with the ribs 118. Then plastic material is molded upon the wheel 110, forming an outer rim 120 with teeth 126.

An internal gear made according to this invention is shown in FIGURES 11 and 12. A hub 132 is shown attached to a shaft 134. Supported by the hub 132 is a disc or web 136 having attached thereto an annular rim 138. The internal surface of the rim 138 is provided with a plurality of ribs or protuberances 139. A liner 140 comprises a support ring 142, which is provided with a plurality of apertures 144 therethrough, as shown in FIGURE 11.

The liner 140 may be provided by inserting a support ring 142 into the cavity formed by the rim 138 so that the support ring 142 is in firm engagement with the ribs 139. Then plastic material is molded upon the support ring 142 on opposite surfaces thereof and extending through the apertures 144. Teeth 148 are formed in the inner surface of the plastic material during molding thereof.

Another method of producing the internal gear of FIGURES 11 and 12 is by producing the liner 140 and then inserting the liner 140 into the cavity formed by the rim 138. Plastic material is molded upon the support ring 142 with the material extending through the apertures 144. The plastic material is formed with a plurality of grooves 146 in the outer surface thereof, as shown in FIGURE 12. Each of the grooves 146 exposes a portion of the support ring 142. The teeth 148 are formed on the inner surface of the plastic material during molding thereof.

The liner 140 fits snugly within the rim 138 with one of the internal ribs of the rim 138 disposed within each of the grooves 146 and with each of the ribs in firm engagement with the support rings 142. Thus, the liner 140 is secured within the rim 138.

Due to the fact that the support ring 142 is in firm engagement with internal ribs of the rim 138, any heat generated within the plastic material is readily carried from the support ring 142 to the rim 138 and to the web 136. If so desired, a plurality of radiators 150 may be provided on the outer surface of the rim 138 to assist in the cooling thereof.

FIGURE 13 discloses a bevel gear made according to this invention. A support structure 152 has a cylindrical portion 154 and a tapered diverging annular portion 156. Attached to the cylindrical portion 154 and also to the tapered portion 156 and extending therebetween is an auxiliary support member 158. The support member 158 and the tapered portion 156 are shown as having extending portions 160 attached together. The support members 158 are perforated with a plurality of apertures 162.

Plastic material is molded upon the support members at the perforated portions thereof so that the plastic material extends through the apertures 162. The extending portion 160 serves as a radiator to assist in transferring heat from within the plastic material. A plurality of teeth 164 are formed in the plastic material adjacent the tapered portion 156 during the molding of the plastic material. Also, a bore 166 is formed through the plastic material during the molding thereof, and may be splined as shown, if desired. The plastic material is molded in a manner to provide the bevel gear with a thrust surface 168.

Any of the gear members as shown in the drawings and as discussed above may have a bore adapted for rotatable mounting upon a shaft. If plastic material, such as nylon or Teflon or the like from which the gears are made, is in direct engagement with the shaft, the gear member is readily rotatable upon the shaft and there is a low coefficient of friction between the shaft and the gear member. Also, when any of the gear members, as discussed above and as shown in the drawings, is in meshed relation with another gear member, the amount of lubrication between gear members may be at a very minimum. The plastic material provides a gear member which is very quiet in operation.

In a gear member made according to this invention, the support member or members serve both as heat transfer means and as support means. The support members are of sufficient strength to be capable of resisting the internal mechanical forces of the plastic material which may attempt to change shape or form. A support member in a gear of this invention is also of sufficient strength to withstand the forces created during engagement of the gear with another mechanical member.

Also, it is to be understood that the gear members of this invention may be constructed at comparatively low cost and may be sturdily built.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A gear comprising an annular casing of metallic material having an inner surface and an outer surface, the casing having a plurality of inwardly extending ribs on the inner surface thereof, a liner within the casing, the liner being of a plastic material and having an inner surface and an outer surface, there being a metallic support ring within the plastic material, the outer surface of the liner having grooves therein exposing the metallic support ring, the radial ribs of the casing extending into the grooves so that the ribs firmly engage the metallic support ring, the inner surface of the liner having a plurality of teeth.

2. A gear according to claim 1 in which the metallic support ring has a plurality of holes therethrough and the plastic material extends through the holes.

3. A bevel gear member comprising a support ring, a tapered support member attached to the support ring and extending therefrom, the support ring and tapered support member having apertures therethrough, a body of plastic material attached to the support ring and the tapered support member with the plastic material extending through said apertures, there being a tapered surface of plastic material adjacent the tapered support member, there being a plurality of teeth in said tapered surface of the plastic material, the tapered support member being disposed closely adjacent the teeth in said tapered surface, there being an opening through the body of plastic material for a shaft for support of the gear member.

4. A gear wheel comprising a metallic hub, a metallic web attached to the hub and extending angularly therefrom, the web having a flange at the periphery thereof, the flange having an outer surface provided with a plurality of ribs extending slightly therefrom, an annular body of plastic material carried by the flange at the outer surface thereof, a metallic ring within the body of plastic material, the body of plastic material having an inner surface provided with a plurality of grooves therein, each of the grooves being of sufficient depth to expose the ring within the body of plastic material, each of the ribs of the flange being snugly disposed within one of the grooves of the body of plastic material with each rib in engagement with the ring which is disposed within said body of plastic material, the body of plastic material having an outer surface provided with a plurality of teeth, the ring being closely adjacent said outer surface of the plastic material.

5. A wheel comprising a hub member of a given diameter and a rim member of a greater diameter, each of said members including a metallic support ring having a plurality of apertures therethrough, an annular body of plastic material attached to each of the support rings with the material extending through the apertures thereof, one of the bodies of plastic material having an engagement surface, the support ring being closely adjacent the engagement surface, and a metallic connector disc extending into both of the annular bodies of plastic material and connecting the hub member to the rim member.

6. A gear comprising an outer support ring and an inner support ring concentric therewith, the outer support ring having a plurality of concentric portions, said portions being of decreasing diameter along the length of the outer support ring, each of the support rings having a plurality of apertures therethrough, a body of plastic material carried by the support rings and extending through the apertures thereof, the plastic material having surfaces of decreasing diameters adjacent the outer support ring and parallel to said concentric portions thereof, each of the surfaces being provided with a plurality of teeth, there being at least one of the support rings closely adjacent each of the surfaces which are provided with the teeth.

7. A gear comprising an annular member having a plurality of ribs on a surface thereof, a support ring having a plurality of apertures therethrough, a body of plastic material carried by the support ring and extending through the apertures thereof, the body of plastic material having a surface provided with a plurality of grooves therein, each of the grooves exposing a portion of the support ring, there being one of said ribs of the annular member disposed within each of the grooves of the body of plastic material with each rib firmly engaging a portion of the annular member, the body of plastic material also having a surface provided with a plurality of teeth therein.

8. Mechanism of the type described comprising support structure including a support cylinder having a bearing surface at the periphery thereof, a wheel rotatably carried by the support cylinder, the wheel including a support ring, a plastics material carried in an annular form upon the support ring, the material having an inner surface in sliding engagement with the bearing surface of the support cylinder so that the wheel is readily rotatable upon the support cylinder.

9. A gear wheel comprising a hub which includes a support ring, the support ring having a plurality of apertures therethrough, an annular body of plastic material carried upon the support ring and extending slightly from surfaces of the support ring, the plastic material extending through the apertures of the support ring, the gear wheel also comprising an outer annular member which includes an outer support ring having a plurality of apertures therethrough, an annular body of plastic material carried upon the outer support ring and extending slightly from surfaces thereof, the plastic material extending through the apertures of the outer support ring, the last said annular body of plastic material having an outer surface provided with a plurality of teeth, a support disc intermediate the hub and the outer annular member, the support disc extending into the plastic material of the hub and into the plastic material of the outer annular member, the support disc being in engagement with the support rings of the hub and the outer annular member.

10. In a wheel for rotative mounting upon a shaft, a support ring provided with apertures therethrough, the ring being somewhat larger in diameter than the shaft, nylon material carried by the ring and extending through the apertures thereof, the nylon material having a surface only slightly larger than the shaft and slidably movable thereupon, said ring being closely adjacent the said surface which is slidably movable upon the shaft.

11. A mechanical member for rotation upon a shaft comprising a support ring, the support ring being of rigid material which is a good thermal conductor, the ring having a plurality of holes therethrough, a body of material of the plastics class carried by the support ring, the material extending through the holes and being in firm engagement with the ring, the plastic material having an engagement surface slidably movable upon the shaft.

12. A member for mounting upon a shaft, comprising a support ring provided with a cross section having a thickness dimension and a width dimension, a plurality of holes extending through the thickness of the support ring, a body of material of the plastics type carried by the support ring with the material extending through the holes thereof, a disc of thermal conductor material connected to the support ring and extending therefrom normal to the width dimension thereof, the plastic material having a surface parallel to the width dimension of the support ring upon which teeth are disposed, the plastic material having another surface parallel to the width dimension of the support ring which is slidingly engageable with the shaft for rotative movement of the body of plastic material upon the shaft, the thermal conductor material transmitting heat to the atmosphere which is generated within the body of plastic material.

References Cited in the file of this patent

UNITED STATES PATENTS

| | | |
|---|---|---|
| 1,427,892 | Alken | Sept. 5, 1922 |
| 1,524,555 | Kempton | Jan. 27, 1925 |
| 1,771,370 | Benge | July 22, 1930 |
| 1,847,926 | Chase | Mar. 1, 1932 |
| 2,064,435 | Loeffler | Dec. 15, 1936 |
| 2,228,828 | Imai | Jan. 14, 1941 |
| 2,622,949 | Cotchett | Dec. 23, 1952 |
| 2,643,549 | Whitesell | June 30, 1953 |
| 2,673,470 | Cosmos | Mar. 30, 1954 |
| 2,704,882 | Olson | Mar. 29, 1955 |
| 2,720,119 | Sherman | Oct. 11, 1955 |
| 2,839,942 | Le Van | June 24, 1958 |
| 2,955,481 | Jackel | Oct. 11, 1960 |
| 2,976,093 | Reiling | Mar. 21, 1961 |